United States Patent [19]
Allen et al.

[11] Patent Number: 6,151,568
[45] Date of Patent: Nov. 21, 2000

[54] POWER ESTIMATION SOFTWARE SYSTEM

[75] Inventors: David L. Allen, Fremont, Calif.; Lorne J. Cooper; Gerald L. Frenkil, both of Concord, Mass.; Thomas J. Miller, Billerica, Mass.

[73] Assignee: Sente, Inc., Acton, Mass.

[21] Appl. No.: 08/931,103

[22] Filed: Sep. 15, 1997

Related U.S. Application Data

[60] Provisional application No. 06/026,034, Sep. 13, 1996.

[51] Int. Cl.⁷ .................................................. G06F 17/50
[52] U.S. Cl. ................................. 703/14; 716/18; 703/18
[58] Field of Search ..................................... 364/488, 489, 364/490; 395/500; 703/14, 18; 716/2, 18

[56] References Cited

U.S. PATENT DOCUMENTS

| | | | |
|---|---|---|---|
| 5,426,591 | 6/1995 | Ginetti et al. | 364/489 |
| 5,481,484 | 1/1996 | Ogawa et al. | 364/578 |
| 5,487,018 | 1/1996 | Loos et al. | 364/489 |
| 5,493,508 | 2/1996 | Dangelo et al. | 364/489 |
| 5,515,302 | 5/1996 | Horr et al. | 364/578 |
| 5,517,132 | 5/1996 | Ohara | 326/41 |
| 5,519,627 | 5/1996 | Mahmood et al. | 364/488 |
| 5,526,277 | 6/1996 | Dangelo et al. | 364/489 |
| 5,541,849 | 7/1996 | Rostoker et al. | 716/18 |
| 5,555,201 | 9/1996 | Dangelo et al. | 716/1 |
| 5,557,531 | 9/1996 | Rostoker et al. | 364/489 |

OTHER PUBLICATIONS

P.E. Landman et al., Architectural Power Analysis: The Dual Bit Type Method, IEEE Transactions on Very Large Scale Integration (VLSI) Systems, vol. 3, No. 2, Jun. 1995, pp. 173–187.

A., Raghunathan et al., Register–Transfer Level Estimation Techniques for Switching Activity and Power Consumption, 1996 IEEE/ACM Int'l Conference on Computer–Aided Design, ICCAD–96, pp. 158–165.

Chen Chih–Tung et al., A Source–level Dynamic Analysis Methodology and Tool for High–level Synthesis, Tenth Int'l Symposium on System Synthesis, 1997 Proceedings, pp. 134–140.

A. Bogliolo et al., Node Sampling: A Robust RTL Power Modeling Approach, 1998 IEEE/ACM Int'l Conference on Computer–Aided Design, ICCAD 98, pp. 461–467.

C. Guardiani et al., RTL Power Estimation in an Industrial Design Flow, IEEE Alessandro Volta Memorial Workshop on Low–Power Design, 1999, pp. 91–96.

*Primary Examiner*—Kevin J. Teska
*Assistant Examiner*—Russell W. Frejd
*Attorney, Agent, or Firm*—Bromberg & Sunstein LLP

[57] ABSTRACT

A method and apparatus is described which enables a user to analyze an electrical design utilizing a computer. The elements of the electrical design are described at a register transfer level. Embodiments of the invention are described which allow the user to enter the elements described at the register transfer level and estimate the power consumption of portions or all of the electrical design.

65 Claims, 7 Drawing Sheets

POWER ESTIMATION SOFTWARE SYSTEM

This application claims benefit of Provisional application 60/026,034 filed Sep. 13, 1996.

BACKGROUND OF THE INVENTION

The present invention relates generally to estimating the power consumption of a semiconductor chip design. More particularly, the invention relates to a system for estimating power consumption of a semiconductor chip design described at the register transfer level.

As electrical design of circuit boards and semiconductor chips grew in complexity and th( time-to-market requirements shrank drastically, industry and academia focused on computer-aided design tools that estimated, among other things, a given design's power consumption. The demand for battery-powered equipment and other market forces have caused users to desire integrated circuits with lower levels of power consumption. At the same time, the complexity of the designs and the resulting increase in circuit densities and operating frequencies are increasing the power consumed by the design.

Many commercially available computer-aided design tools relied upon by users estimate the power consumption of a semiconductor chip design specified at the logic level or the circuit level. To receive an accurate power estimate using these tools, the user must specify in detail the design with gates or transistors.

Although synthesis tools may be used to specify the design to the required level of detail, such tools require the user to make many detailed architectural and technology implementation choices early in the design process. The user must detail the choices and input the same into the synthesis tool, which outputs the information necessary to run the power consumption estimation. If the power consumption estimate exceeds the desired level and the user seeks to further refine the design, the user must make new choices and input the resulting design changes. This iterative design change process is particularly tedious and time consuming due to the detailed architectural and technology implementation choices the user must re-input with each design change iteration. The prior art methods do not allow the user to change the design to meet required power specifications easily, and all changes result in duplication of the time the user expended formatting the inputs for the synthesis process. Moreover, the synthesis process requires a large amount of computer run time. Further, when a synthesis tool requires the user to describe a system to the logic level with hundreds of thousands of gates, for example, the user finds it difficult and confusing to comprehend the functionality of the entire chip or system.

To alleviate the above concerns, academia and industry have begun to focus on computer-aided tools that accept circuit descriptions at a higher level of abstraction, the register transfer level.. One prior art system, however, still requires that the user make architectural and technology implementation choices, thus requiring specifications on all the circuit elements prior to performing the power consumption estimation. While having some of the benefits of working at the register transfer level, the tool still requires the user to re-input many details regarding each design change iteration, thus resulting in much duplication of effort each time the user must change the design to meet the desired power specifications.

Another prior art system results in less work duplication, but only analyzes part of the power consumed by the chip or system. Moreover, the prior art system treats the chip or system as an inseparable entity, and does not provide power estimates of the different parts or modes of the system or chip.

Accordingly, it is an object of the invention to provide a system for estimating the power consumption of a semiconductor chip design or system that allows a user to estimate the power consumption of a design specified at the register transfer level and forgo specifying all of the gates before producing a power consumption estimation.

It is another object of this invention to allow the user to easily change the architectural and technology implementation choices and evaluate the effect of such changes on the power consumption of the semiconductor chip design or system.

It is still another object of this invention to perform power estimations quickly without requiring a large amount of computer run time.

It is a further object of this invention to estimate the power consumed by the entire semiconductor chip or system and its parts in all its modes.

These and other objects will be obvious and will appear hereinafter.

SUMMARY OF THE INVENTION

The invention relates to a tool and method for analyzing an electrical design. The tool analyzes at least a portion of an electrical design and calculates the power consumed by that portion of the electrical design, where the electrical design includes RTL elements stored as a description in a computer. The tool allows a user to describe the RTL, elements at a register transfer level.

The tool includes a plurality of power modules, an analysis module and a display device. The analysis module selectively associates at least a portion of the RTL elements in ihe electrical design with at least one of the plurality of power modules and generates a sum of power consumed respectively by at least a portion of the RTL elements.

In the preferred embodiment, the analysis module selectively associates the RTL elements with the at least one power module by generating an interconnected set of components, representative of the RTL elements and the connections between the RTL elements, and associating a power module with the components. The components being logic modules some of which are capable of being represented by more than one technology implementation ("inferred components") others of which are associated with a technology implementation provided by the user ("RTL components"). As power consumption is primary consideration of the tool, the interconnected set represents power characteristics of the RTL elements. Thus, the tool generates a useful power consumption estimation of the entire electrical design, more quickly and easily.

In one embodiment, the analysis module also includes a simulator module that propagates the activity data for electrical circuits within the electrical design such that the activity data approximately represent activity data generated for a gate level representation of the electrical circuits. The tool calculates an activity, and thus the power, consumed by each state of the electrical design.

Thereafter the analysis modules calculates the remaining parameters necessary for it to calculate the dynamic and the static power of each cell and net in the electrical circuit, including characterizing clock nets by either a spine or a tree implementation and sums the power consumed by the electrical circuit.

The user interacts with a tool via a display device, where the user provides text files to the (computer using operating system level commands or interactively through a graphical user interface (GUI). The GUI assists the user in supplying information to tie analysis module, such as defaults and user associated power modules.

The display device is also adapted to communicate the sum of the power consumed by the RTL components and the inferred components and the connections between the RTL and the inferred components of at least a portion of the electrical design to a user. The GUI displays the power consumed by the RTL and inferred components and the connections between the RTL and inferred components as the analysis module has associated them. The GUI can display the power consumed with a tree and a frequency display. In one embodiment, the GUI also utilizes a standard non-linear thermal spectrum to show the power consumed by each RTL and inferred component.

In further aspects, this invention provides methods in accordance with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of electronic design simulations and may be embodied in several forms, it is advantageously employed in connection with estimating the power consumption of a semiconductor chip design and will be described as such. One skilled in the art will realize that the invention can be used to estimate power in a multitude of other electronic design processes, such as board design for example, and therefore, this embodiment should be considered illustrative and not restrictive.

Overall Design Cycle

Figure 1:
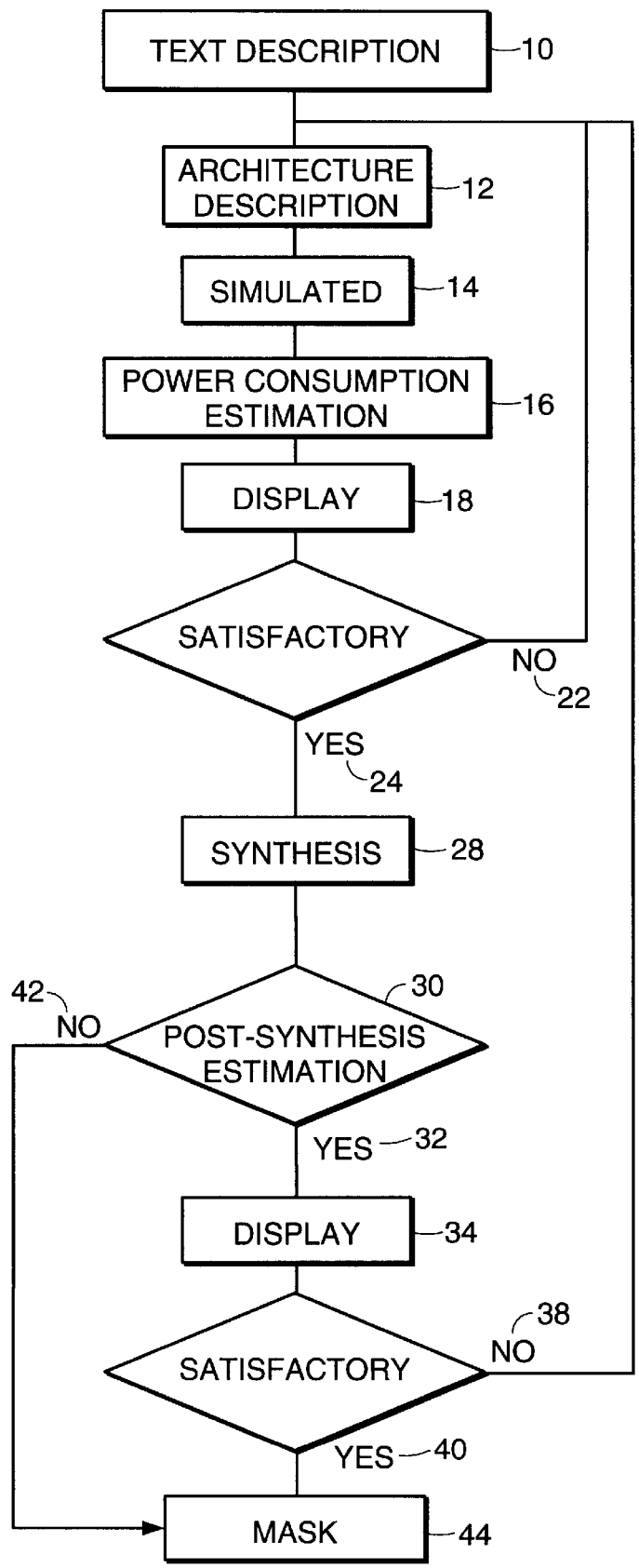
FIG. 1 is a data flow diagram of the design cycle of the invention.

Referring now to FIG. 1, a design cycle using one embodiment of the invention starts with a user generating a text description 10 of the requirements of the semiconductor chip design; requirements are often represented in specification charts, flowcharts and algorithms. A text description specifies the functionality of the semiconductor chip and often details an interface description of the semiconductor chip, including input/output ports and the timing relationships or protocol among the signals at the I/O ports. A text description also usually contains a constraint description of the semiconductor chip. A constraint description can specify technology relations with which the semiconductor chip design must comply to be verifiable, testable, manufacturable and maintainable.

The user then transforms the text description 10 into an architectural description 12 that conforms sufficiently to the constraints of the text description 10. The architectural description 12 is described using a hardware description language (HDL), for example, Verilog™. The architectural description 12 provides further details regarding the RTL elements described at the register transfer level (RTL). The architectural description 12 adds constraints to the semiconductor chip design, including inter alia, the choice of a particular computer architecture (for example, reduced instruction set computer (RISC) or complex instruction set computer (CISC)), layout methodology (for example, standard cell or gate array), or fabrication process (for example, CMOS or GaAS). The architectural description 12 also lists a portion of any states of the semiconductor chip, as well as sequencing of the states of the semiconductor chip. It may also set forth characteristics of a portion of the RTL elements, including the I/O pin configuration and the timing relations among the I/O signals, for example.

Next, the user can simulate 14 the architectural description 12 to determine whether the semiconductor chip design represented by the architectural description 12 conforms sufficiently to the text description 10. Once the user is satisfied with the architectural description 12, an analysis module, as described hereinafter, performs micro-synthesis, activity value collection and power calculations to produce a power consumption estimation 16. The power consumption estimation is then displayed 18 to the user.

If the power consumption estimation is not satisfactory 22, the user can make changes at any phase of the design cycle, for example, the architectural description 12 and rerun the power consumption estimation 16. It will be obvious to one skilled in the art that to fulfill a power consumption specification, the user can also make changes in other parameters involved in the power consumption estimation 16, as hereinafter described.

Once the power consumption estimation is satisfactory 24 to the user, the user will synthesize 28 the semiconductor chip design. Synthesis is a process that refines the description of the semiconductor chip design by adding detail to the description of the semiconductor chip design without substantially violating the constraints of the unrefined description. The design is transformed from an RTL level of abstraction to a gate cell level of abstraction. During the design cycle, the user can continually synthesize the semiconductor chip design until the synthesis 28 produces a logic level description of the semiconductor chip bound to a particular technology. The synthesis 28 transforms the RTL abstraction, as specified in the architectural description 12, to structures contained in a technology library.

After synthesis 28, the user can perform a post-synthesis power consumption estimation 30 using as input, the more refined description of the semiconductor chip design generated by the synthesis 28. If the user performs the post-synthesis power consumption estimation 32, the results are then displayed 34 to the user. If the results are not satisfactory 38, the user can refine the architectural description 12 and rerun the power consumption estimation 16 and/or the post-synthesis power consumption estimation 32. Again, it will be obvious to one skilled in the art that to fulfill a power consumption specification, the user can also make changes in other parameters that effect the power consumption estimation 16 and/or the post-synthesis power consumption estimation 30.

When the post-synthesis power consumption estimation 30 is satisfactory 40 or if the user chooses not to run 42 the post-synthesis power consumption estimation 30, the semiconductor chip design can then be prepared for manufacture 44 by being placed and routed. Thereafter, one can produce a mask representative of the semiconductor chip design after synthesis 28.

In another embodiment of the invention, the user can back annotate data to refine the power consumption estimation, where back annotating means the user supplies input values produced by another source or from the system invention at a stage of the design cycle into the power consumption estimation at an appropriate stage, usually an earlier stage.

Overall Block Diagram

Figure 2:
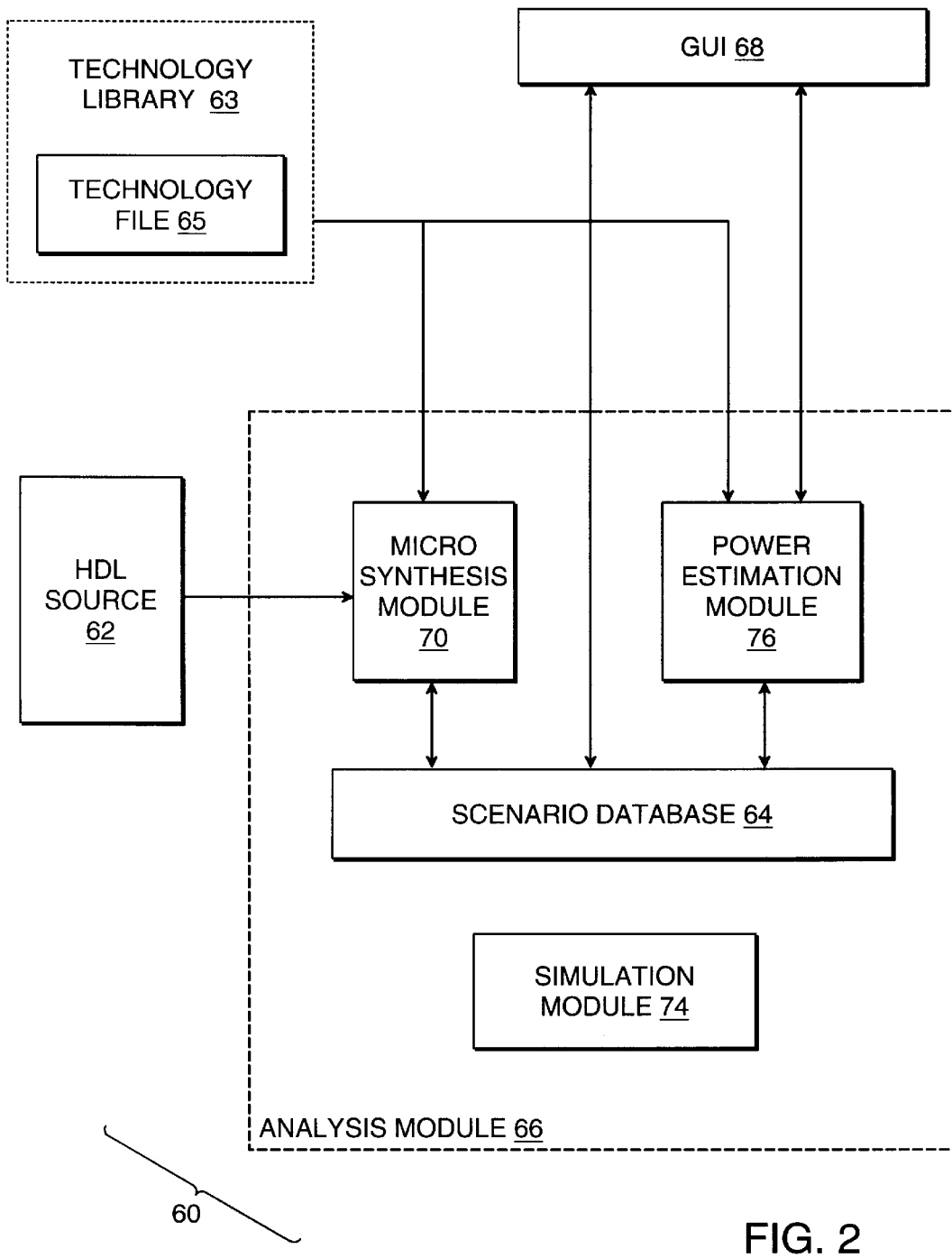
FIG. 2 is a block diagram of the power consumption estimation system of one embodiment of the invention.

A typical system 60 incorporating the principles of the invention, as described in FIG. 1, is illustrated in FIG. 2. The system 60 is implemented on a computer and includes a HDL source description 62 of the design, a technology library 63, an analysis module 66 and a GUI 68. In the preferred embodiment, the user interacts with the system via the GUI 68 and the preferred embodiments of the invention shall be described with reference to the GUI. However, the user can also interact with the system using operating system level commands, UNIX commands, for example, where the results can also be displayed via files without a GUI.

The technology library 63 contains a plurality of technology files 65. The technology files 65 contain a plurality of circuits of low complexity that have been characterized for their power consumption using a particular semiconductor fabrication technology. During the design cycle and prior to calculation of the power estimation, the user selects at least one of the plurality of technology files 65 to use for power estimation. The user makes the selection of one technology file by accessing a SETUP pull-down menu on the GUI 68 and selecting one of the plurality of technology files 65 displayed on the GUI 68.

The analysis module 66 reads the HDL source description 62, containing an architectural source description, and the technology file 65 selected by the user and inputs the same into a scenario database 64, thereby allowing the analysis module 66 to read and write to the scenario database 64 throughout the implementation of the invention. The analysis module 66 or its parts, as hereinafter described, do not have to place the HDL source description 62, the technology file 65 or the other information generated by the system 60, into a separate database file, or storage device, as long as it has access to the information. The scenario database 64 is used herein only for explanation purposes.

The analysis module 66 is comprised of a micro-synthesis module 70, a simulator module 74 and a power estimation module 76. After the analysis module 66 reads the HDL source description 62, the micro-synthesis module 70 performs micro-synthesis on the RTL elements. As used herein, "micro-synthesis" refers to generating an interconnected set of components also known as RTL blocks, such as 64-bit adders, 32-bit multipliers, decoders, n-bit unencoded multiplexors, n-bit 2-1 multiplexors, ALUs, MUXs, registers and memories, for example. Micro-synthesis is the process of taking the HDL description of the RTL elements and transforming at least a portion of the HDL description to an interconnected set of these components. This is in contrast to standard synthesis which takes the HDL description and transforms it into an interconnected set of gate level primitives. The logic modules, such as adders, for example, produced by the micro-synthesis are technology independent and, thus, do not have any definite size, energy or input capacitances associated therewith. As such, the user can implement the function of the logic modules using more than one technology implementation. For instance, the user can implement a 64-bit adder using a carry-lookahead implementation or a ripple carry implementation. Thus, the different implementations of the same logic module will have different gate level representations and, therefore, also will have different power consumption characteristics.

The micro-synthesis module 70 automatically associates each logic module with the most appropriate power module using a set of default rules, as hereinafter described, unless the user alters the default rules. The user can also alter the automatic association. The plurality of power modules generated by the micro-synthesis module 70 comprise a power netlist, which the micro-synthesis module 70 writes to the scenario database 64

The GUI 68 displays the associations between the components and the power modules. At this point, the user may associate the power modules interactively through the GUI 68 and any changes are written to the scenario database 64. After the user has completed interactively associating the power modules, the simulator module 74, in conjunction with the power estimation module 76, as hereinafter described, combines the power netlist with input from the user to generate activity values for each pin described in the power netlist. Finally, the power estimation module 76 reads the scenario database 64 and calculates the power consumption estimation for the semiconductor chip design, which is thereafter displayed on the GUI 68.

Micro-Synthesis Module

Figure 3:
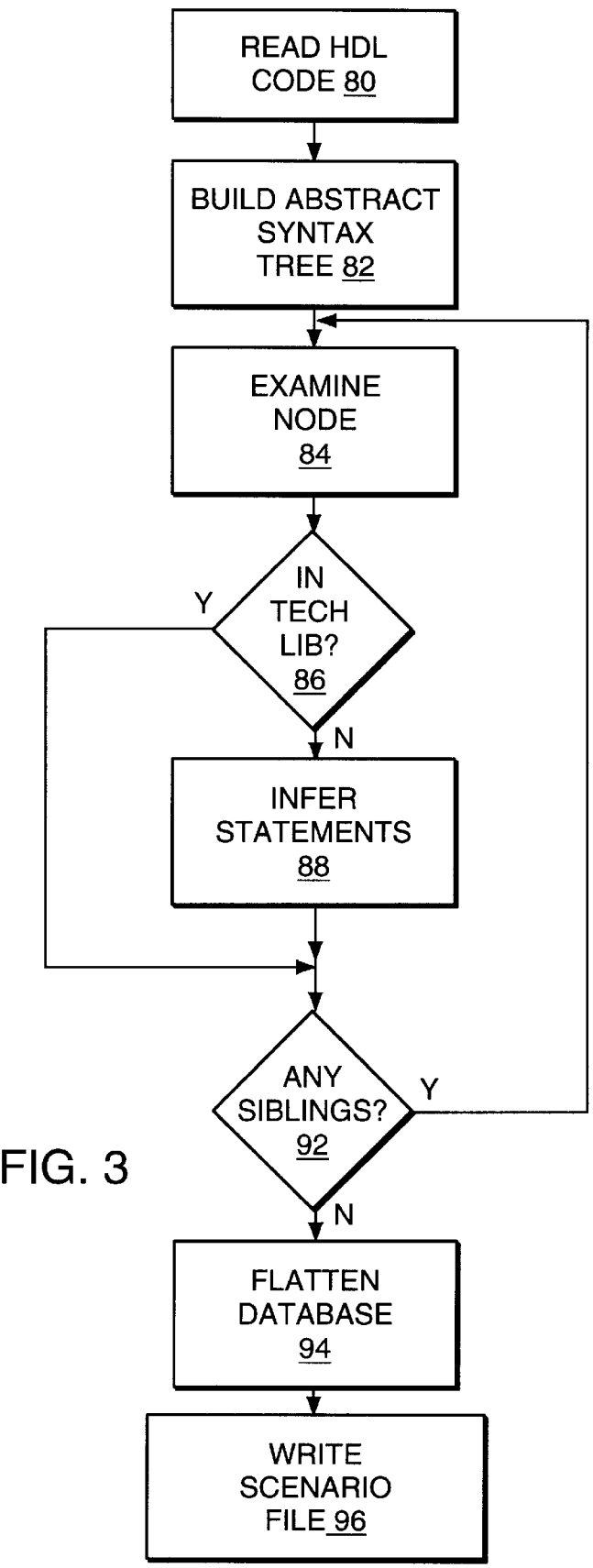
FIG. 3 is a data flow diagram of an analysis procedure for the system according to FIG. 2.

Referring now to FIG. 3 with continued reference to FIG. 2, FIG. 3 illustrates the micro-synthesis module 70 which examines 80 the information regarding the HDL source description 62. The micro-synthesis module 70 builds an abstract syntax tree 82, which is a representation, in whole or in part, of the semiconductor chip design represented by the HDL source description 62. The abstract syntax tree is a well-known method of storing a computer program in a machine-readable format that has nodes. Substantially, each node of the tree contains a collection of sub-nodes. Each node (or sub-node) represents a statement (or a portion of a statement) of the HDL source description 62. The micro-synthesis module 70 examines each node 84 of the abstract syntax tree and extracts the RTL elements and the connections between the RTL elements. It places references to them in the scenario database 96; thereby extracting the structure of the semiconductor chip design as described in the HDL source description 62.

Beginning it the topmost node of the abstract syntax tree, the micro-synthesis module 70 examines each node. If the micro-synthesis module 70 determines that the node is a reference to an element in the technology file 86, such as a memory or an I/O cell, the micro-synthesis module 70 will not associate a new logical module with the node. Instead, it extracts any references to the technology implementation associated with the node, for example the depth, width and bus size of a memory module and produces, what has been called herein, RTL component. If the node is not a reference to an element in the technology file, the micro-synthesis module 70 examines the node and its sub-nodes 88. It will read each node and its sub-nodes and infer one or more logic modules, where appropriate. For instance, the micro-synthesis module 70 will associate a behavioral modeling statement contained in a node and its sub-nodes with logic modules that perform the behavior. For example, the microsynthesis module 70 will associate a case statement with a logic module of decoders and will associate a question mark—colon statement with a logic module representing 2-1 multiplexors. Thus producing components that include RTL component with references to the technology file and inferred components that are technology independent logic modules.

The micro-synthesis module 70 defaults to select power modules of the same type as the component with the most area efficient implementation. The user can change the default from an area efficient power module to another default implementation emphasizing other characteristics such as delay, for example. To change the defaults, or to override the association for one particular module, the user accesses a pin association window, as described hereinafter. To perform this override, the user accesses the GUI 68 after the micro-synthesis module 70 has completed its task.

Once the node and its sub-nodes have been inferred 88, the micro-synthesis module 70 continues on to process, the next sibling node 92. In this way, the entire design hierarchy contained in the abstract syntax tree is processed recursively.

The micro-synthesis module 70 then flattens 94 the hierarchical representation of the semiconductor chip design produced by the inferencing. Flattening a hierarchical representation is a technique well known in the art, which transforms the hierarchical relationship into a single flow diagram of connected elements. The flattened design retains the hierarchical relationships represented in the scenario database 64, in part by using pointers to other aspects of the design. Flattening 94 is the process of recursively applying constraints representing the single flow relationship to each level described in the scenario database 64 until a single flow diagram embodies the information represented by the abstract syntax tree. The micro-synthesis module 70 writes the flattened tree to the scenario database 96, which then becomes input for the other modules described in FIG. 2. It should be obvious to those skilled in the art that the order the micro-synthesis module 70 creates; the flattened tree can be easily altered without diverting from the scope of the invention.

As described above, the micro-synthesis module 70 performs a process well known in the art as language parsing, logical operator inferencing and flattening to refine the behavioral description of the semiconductor chip. Since power consumption is the focus of the analysis, the micro-synthesis module 70 does not, however, have to ensure that the functionality of the RTL components perfectly comply with the behavioral description of the RTL elements and the connections between the RTL elements. Thus, the micro-synthesis module 70 is faster than most prior art RTL synthesis tools. The micro-synthesis module 70 only has to comparably synthesize the HDL source description 62 into the flattened tree. The flattened tree will represent a simplified description of the components and the connections between the components suitable for the power consumption estimation.

EXAMPLE
Memory Power Modules

As described above, the micro-synthesis module 70 associates RTL components of memory with power modules. These power modules also represent the implementation of the memory, including but not limited to, single-ended or differential memory, whether the bit-lines are pre-charged, and whether the operation is synchronous or asynchronous, inter alia. The power module for a memory is composed of a specification section, a pin section, a transition section and a data section. The function of the sections with respect to a simple memory is set forth below. One skilled in the art will note that other embodiments involving more complex memory will involve extrapolation or additional modeling of the same principles.

The specification section of the power module for a memory contains descriptive information, including the type of power modules associated with the memory and the name of the power modules.

The pin section defines the pins of a power module. Specifically, the pin section describes information about the input or output buses. Each line in the pin section enables the analysis module 66 to verify the pin configuration of the power module for a memory and understand the function of one pin on the power model. Each line of the pin section has four fields: the name, width, sense, and pinclass.

The first field of the line is the name field that contains a name of the memory pin as originally set forth in the HDL source description 62.

The second field of the line is the width. The width indicates number of bits on the memory pin and whether the presence of the pin is optional or necessary. A width field of 1 indicates the pin is one bit wide. A width field of [0:1] shows the pin is one bit wide and the presence of the pin is optional. A width field of [1:n] states the pin is one or more bits wide. Finally, a width field of [0:n] indicates that the pin is optional, but may be more than one bit wide.

The third field of the line is the sense field. The sense field has three possible values and indicates whether the pin is a data pin, active high, or active low.

The fourth and final field of the line is the pinclass. The pinclass describes the type of pin. Possible values of this field for a ROM include, for example, clock, address bus, chip select, output enable, control input, control output, or data output bus. For a RAM, additional possible values include data input bus and write enable.

The third section of the power module for the memory is the transition section. The transition section describes the modes of the power module, and the pin transitions associated with each mode. Each line of the transition section contains information about one energy-consuming action of the memory, and consists of three fields: an energy field, an edge field, and a function field. The energy field of the line names an energy parameter to be used when computing the energy due to this line. The edge field of the line defines which transitions on the pins indicate energy is consumed, such as an active edge, an inactive edge, a data edge, or an indication that any bit on the bus has changed. The function field relates the pins of the memory to each other using logical operators. A logical relation defines when the transition consumes energy. It enables the system to determine the energy consumed over time by the memory component.

The data section specifies the physical characteristics of the power module for memory, such as input pin capacitance, energy, DC power, and size, via an arithmetic representation or an enumerated list. The data section and the transition section of the power module combined with the activity values collected by the simulator module 74 enable the system to calculate the power consumption of each mode of the memory, not just a single value for the entire memory.

Graphical User Interface

Figure 4A:
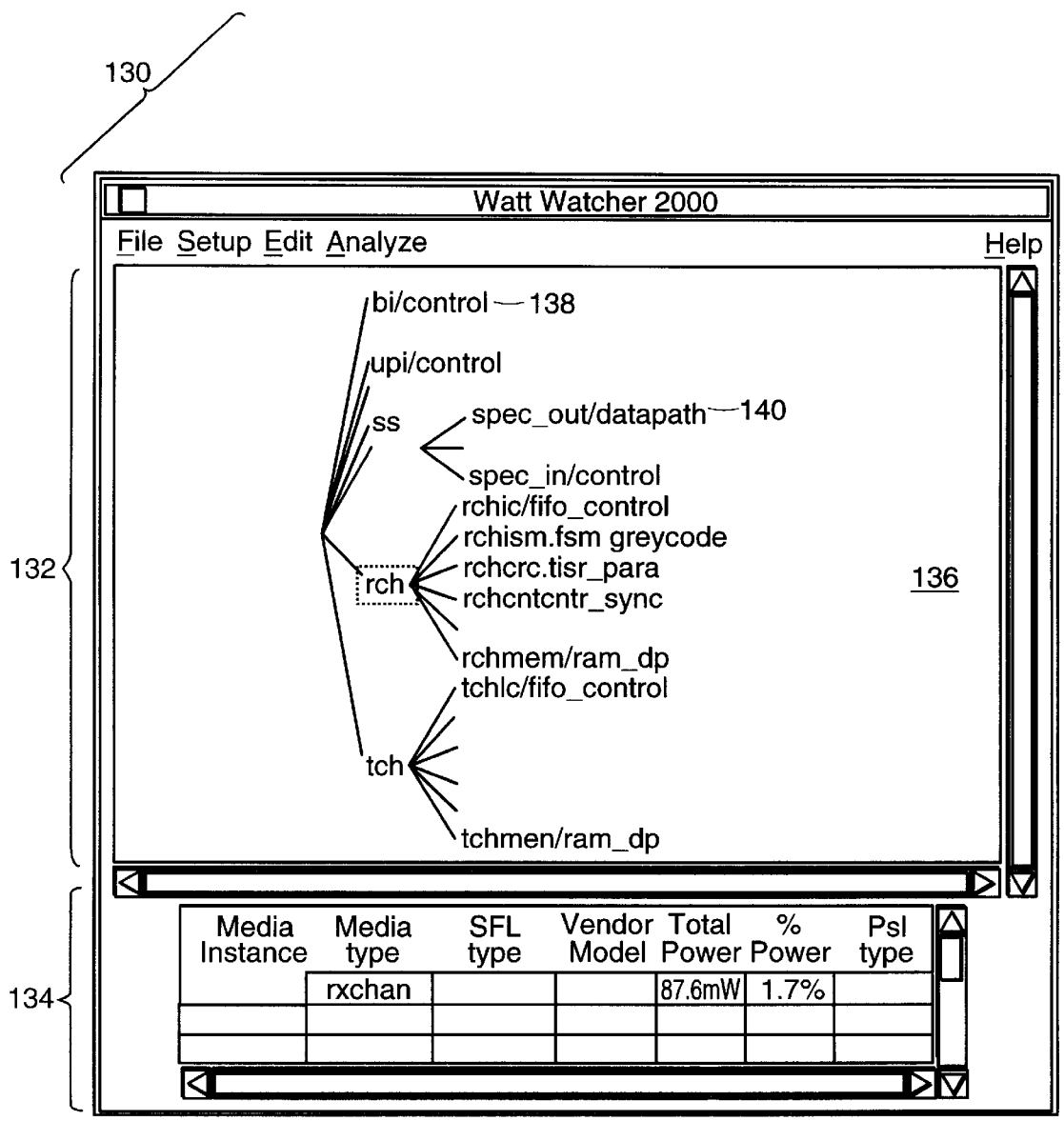
FIG. 4A is a pictorial view of a hierarchical browser that implements an embodiment of the present invention.

Referring now to FIG. 4A, FIG. 4A illustrates a GUI representation of the electrical design as shown by a hierarchy browser 130. Although the manipulations by the user of the GUI 68 are described with reference to FIG. 2 and 3, the user can interact with the hierarchy browser 130 at any point after the user has loaded the semiconductor chip design into the system. The hierarchy browser 130 has two panels, a top panel 132 and a bottom panel 134. The top panel 132 represents the semiconductor chip design as a tree 136 having nodes 138, sub-nodes 140, and leaf nodes (not shown) containing the components. The hierarchy browser 130 does not display all the nodes 138, sub-nodes 140, and leaf nodes of the tree 136 in the top panel 132 at one time. Instead, the user can scroll through the tree 136, thereby selecting the nodes 138, sub-nodes 140, and leaf nodes of the tree 136 to view.

When a user selects a node 138, sub-node 140 or leaf node of the tree 136, the bottom panel 134 displays information about the selected node. The hierarchy browser 130 is initialized to display default information, including the RTL or inferred component's name, labeled "Module instance"; the RTL or inferred component's type as set forth by the micro-synthesis module 70 or confirmed with the HDL description by the micro-synthesis module, labeled "Module type"; the power module associated with the RTL or inferred component, by the micro-synthesis module 70, labeled "SFL model name"; and the vendor model name if a vendor specific memory power model has been associated with the RTL element component. The bottom panel 134 also displays the power consumed by the component, when calculated by the power estimation module 76, labeled "total power." The bottom panel 134 further displays the percentage of power consumed by the RTL or inferred component or the connections between the RTL or inferred components with respect to the total power consumed by the semiconductor chip design. Further, the bottom panel 134 displays whether the power estimation was conducted at the RTL level or the gate level.

Figure 4B:
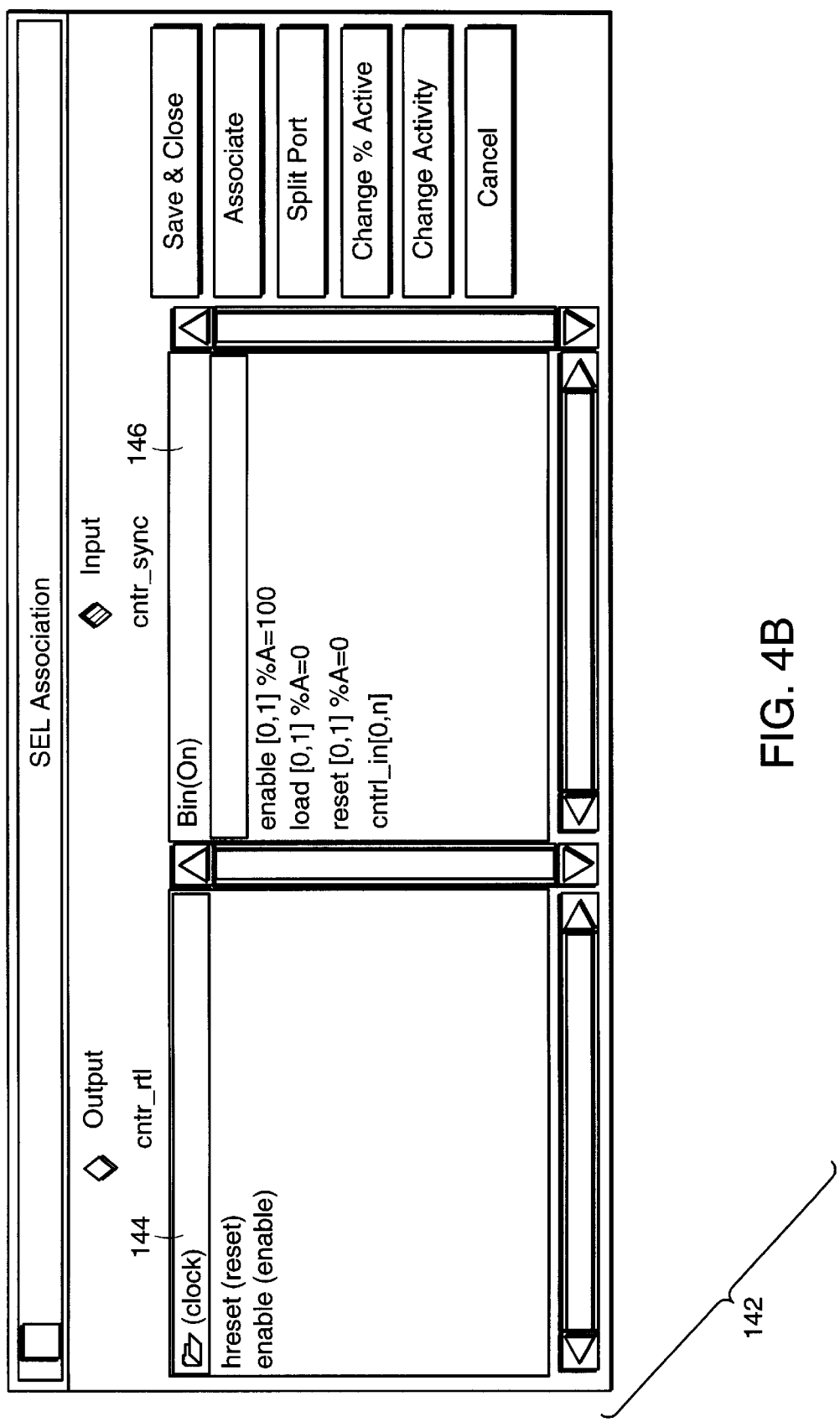
FIG. 4B is a pictorial view of a pin association box of a hierarchical browser that implements an embodiment of the present invention.

The user can change the information shown by the hierarchy browser 130 in the top panel 132 or the bottom panel 134 by using a preference window, for example. The user accesses the preference window by selecting SET PREFERENCES from the menu of the hierarchy browser 130. The user can choose the depth of the tree 136, to show all nodes or only a portion of the nodes, whether to display I/O pads, and alter colorization schemes. Referring now to FIG. 4B, a pin association window 142 is shown, which illustrates one method by which a user can manually associate power modules with the components. To access the pin association window 142, the user selects ASSOCIATE MODEL from the edit pull-down menu on the hierarchy browser 130. This will produce a list of power modules available for association with the components. After the user selects the power module from the list, the pin association window 142 is displayed to the user. The pin association window 142 has two scrollable panels, the left panel 144 and the right panel 146. The input pins are shown on the pin association window 142. The user can access the output pins (not shown) by toggling between the input pin display and the output pin display. To complete the association, the user selects the pin of the component shown in the left panel 144 and then selects the pin class of the power module shown in the right panel 146. In this example, the user has selected the clock pin of the component and the power module. The user then selects the ASSOCIATE button to complete the association. The system will then automatically select the next pin of the component to be associated. The user repeats this process for each pin, and for any other components with which the user chooses to override the power models chosen by the micro-synthesis module 70 by default.

Once power has been computed as described below, the GUI 68 uses color to visually show how much power each power module consumes. The GUI 68 uses a thermal spectrum, where red indicates the RTL or inferred component consumes a large amount of power and blue indicates the RTL or inferred component consumes a small amount of power. The colors are assigned to each node in the tree based on a percentage of power used by a subtree of the node, where the subtree is composed of the nodes, sub-nodes and leaf nodes. The hierarchical browser 130, however, does not assign the colors in a linear arrangement, because most of the power modules consume a small portion of the power. Thus, the user could not easily visually detect the differences. Accordingly, the colors are assigned by percentages of power consumed with more color changes at the small power consumption end of the spectrum.

The GUI 68 provides two other methods of displaying the power consumption estimation. The user has the option of seeing the results of the power calculation in a summary form, which lists power consumed by clocks, nets, dynamic, static, and pads. Otherwise, the user can view the results of the power estimation by selecting a frequency display. The frequency display shows the effective frequencies of the inputs and outputs of a power module. The frequency can be displayed at a port of the power module, as either the sum of all bits entering the port or bit by bit.

Simulator Module

The simulator module 74 shown in FIG. 2 can perform the following functions, as described in this section: collecting activity data from simulation; estimating activity data if functional simulation is not performed; correcting activity data to match gale level results; and accounting for multiple modes in a system. .

The activity data include, but are not limited to, toggle rate, activity value and duty cycles. The toggle rate is the average rate at which a signal changes state. More specifically, the toggle rate is the number of transitions of a signal divided by the time over which the transitions were accumulated. Simplified, the toggle rate equals twice the signal's frequency, since a full cycle requires the signal to have two edges. The activity data also include-the duty cycle, which is the percentage of time a signal is in an active state. The activity value, which is a number between zero and two, is also an activity data collected by the simulator module 74. The activity value is the expected number of signal transitions per clock cycle, which is the ratio between the effective switching frequency of a node and the primary clock frequency of the design, as specified by the following equation:

$$I = T/(t\, f\, clk)$$

Where I=activity value
t=elapsed time T
T=number of times the signal changes state
fclk=frequency of the primary clock The following equation relates the toggle rate and the activity value $$\text{toggle-rate (signal)} = 2*\text{feff(signal)} = \text{Ifclk} = T/t$$

feff=the effective frequency of the signal

After all the power modules are tied to a technology implementation, as described hereinafter, the simulator module 74 collects the activity data for each node of the design. The simulator module 74 works in conjunction with the power estimation module, but will be described herein separately for clarity. It should be apparent that 76 the system can be configured using one or more than one module with functionality divided among the modules as is necessary. It should also be obvious to one skilled in the art that the simulator module 74 can collect and generate the activity data in a different order or manner without diverting from the scope of the invention.

Collecting Activity Data from Simulation

In one embodiment, the user may enter activity data using the GUI 68 or a text file. In this embodiment the simulator module 74 works in conjunction with commercial tools for simulation known to those skilled in the art, including Verilog/XL, Chronologic VCS, or Avant! Purespeed.

Estimating Activity without Simulation

The most accurate power estimations are performed when activity data is acquired from simulation for every node in the design. Where that is not possible, estimation can be performed using a technique called activity propagation. To perform activity propagation, the system first orders the modules.

Figure 5:
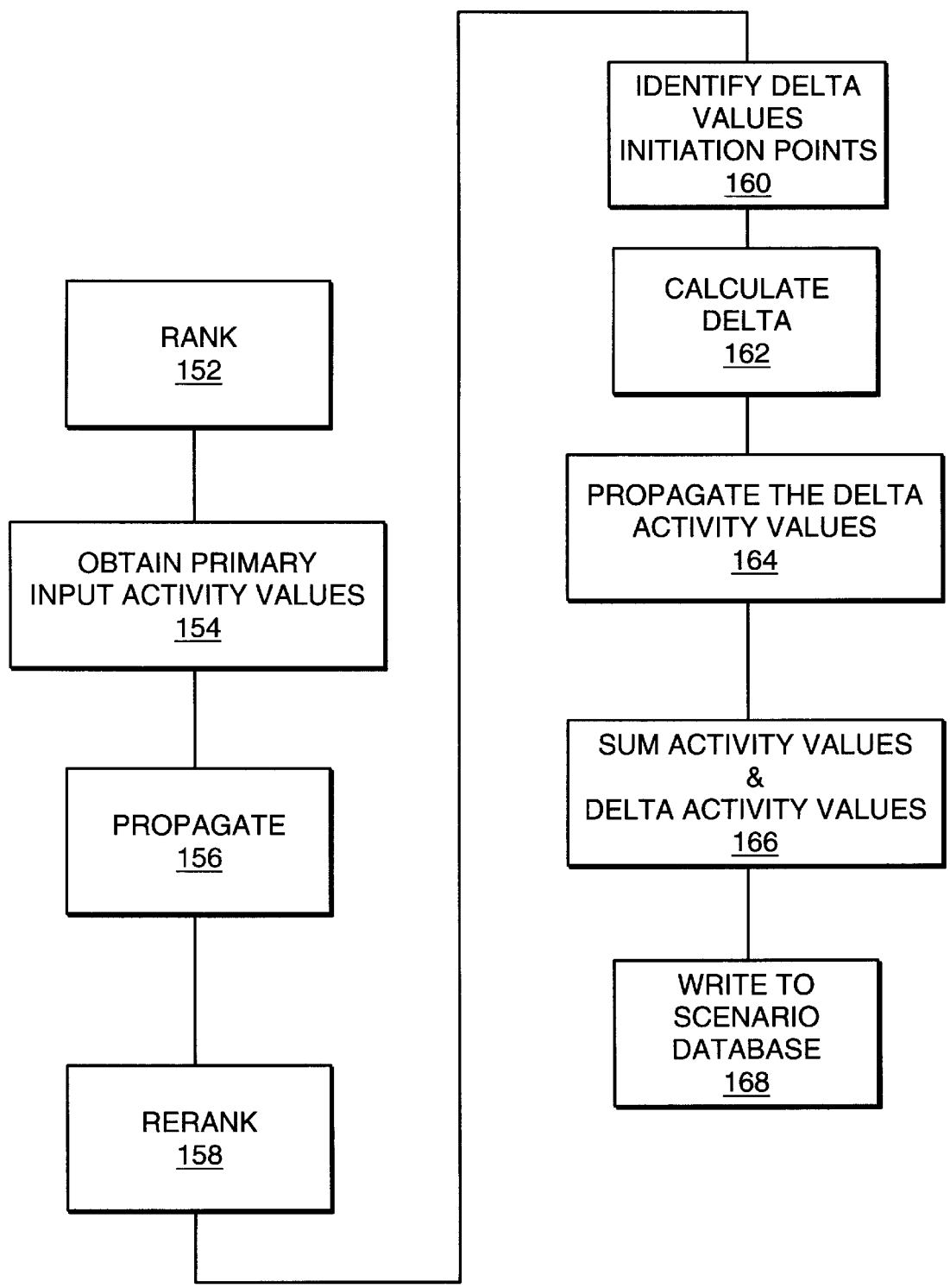
FIG. 5 is a data-flow diagram of an activity propagation procedure for the system according to FIG. 2.

Referring to FIG. 5 with continuing reference to FIG. 2, the simulator module 74 has an ordering module and a propagation module. The ordering module ranks the power modules into a partially ordered list 152. For example, if the circuit connects the output of power module f1 to the input of power module f2, then power module f1 will be ranked as the predecessor module of power module f Due to constraints of the semiconductor chip design, however, including the existence of feedback loops, the ordering module often cannot consecutively rank all the power modules. For example, power module f1 and power module f2 are in a feedback loop when the output of power module f1 is input for power module f2, and the output for power module f2 is the input for power module f1. Under such conditions, the ordering module cannot order the power modules f1 and f2 without cutting one connection between the power modules in the feedback loop. Thus, the ordering module cuts the connection in the feedback loop that is electrically nearer to the circuit inputs, known as a cut node. This embodiment uniquely applies the above-described method to activity propagation.

After the ordering module orders the power modules 152, the simulator module 74 receives primary input activity values of the primary inputs of the semiconductor chip design from the user 154. Typically, the number of primary inputs is smaller by a factor of more than a hundred than the number of nodes in the semiconductor chip design.

Thereafter, the propagation module reads the primary input activity values, the ordered power modules and the power netlist, and then propagates the primary input activity values through the semiconductor chip design 156. First, the propagation module calculates the activity values of all pins of the power modules disposed within the first rank.

Before moving to the next rank, the propagation module ascertains whether the rank contains any cut nodes. If so, the propagation module sets an activity value for the cut nodes to 0.4, and again propagates the activity values for that rank. If the activity values for the cut nodes are within a predetermined tolerance of their previous value when the propagation module first propagated that rank, the propagation module continues to the next rank. If the activity values are not within the predetermined tolerance, however, the propagation module will iteratively propagate the activity values on the cut nodes until they stabilize or until the number of iterations reaches a predetermined limit. At that point, the propagation module calculates the average of the previous activity values for the cut nodes, and then continues to the next rank. After propagating the activity values through the entire semiconductor chip design, the propagation module outputs the activity values for each pin of the power modules.

Correcting for Gate Level Activity

In practice, the activity values calculated using an RTL description of a semiconductor chip are less than the activity values of a gate level description of the same semiconductor chip. The difference exists because the RTL description assumes that the circuit has no delay between operations, while the gate level description evidences a number of delays. The difference between the activity values of an RTL description and a gate description will be hereinafter referred to as the "delta value."

To compensate for the delta value, this embodiment estimates the delta activity values and writes to the scenario database 64 the sum of the delta activity values and the activity values generated from the RTL description as the activity value of the semiconductor chip design. To determine the delta activity values, the simulator module 74 begins by calculating where the delta values initiate. After the simulator module 74 determines the magnitude of the delta values, the simulator module 74 inputs the delta value and a modified ranking, as hereinafter described, of the power modules into the propagation module. The propagation module then generates the delta activity values for each pin on the power modules.

The ordering module modifies the initial inputs. Instead of ordering the power modules from the primary circuit inputs to the circuit outputs as before, the ordering module ranks the power modules following the clock register outputs through the power modules at the clock register inputs 158. This is because the RTL toggle counts are only identical to gate level toggle counts at register outputs.

After the ordering module generates the modified rank, the simulator module 74 determines where the delta values initiate 160. The delta values initiate 160 when the signals to a power module arrive asynchronously, where each signal has a "synchronizer." The simulator module 74 defines that a delta value is initiated 160 each time the signals arriving at a power module have different synchronizer values. If the clock drives a signal, the signal's synchronizer is the clock signal having the same value as the clock signal. Otherwise, the signal's synchronizer is set to "none." After the simulator module determines when delta values initiate 160, the simulator module 74 computes the quantity of the delta value 162 using a different mathematical model for each type of power module.

The simulator module 74 inputs where the delta values initiate, the delta values, the modified ranking, and the power modules into the propagation module. Thereafter, the propagation module generates the delta activity values 164 for each pin of the power modules, except that the propagation module propagates the delta activity values 164 from the clock register outputs and stops at the clock register inputs.

Mode Dependent Power

If the semiconductor chip design has more than one mode, the simulator module 74 will collect activity statistics for each mode. A semiconductor chip design may have several operational modes. For example, a transceiver chip may have three modes: transmit, receive, and idle, while a processor may have two modes: active and sleep.

To allow the simulator module 74 to collect activity statistics on each mode, the user informs the simulator module 74 of the signals that indicate the semiconductor chip is in a certain mode. These signals are called mode control signals. If needed, the user can add information to the simulation to produce the needed mode control signals.

When the simulator module 74 reads mode information, the simulator module performs additional steps while it collects the activity statistics. Specifically, the simulator module 74 allocates a plurality of counters to count the toggles for each signal it monitors. When a mode control signal changes, the simulator module 74 determines whether the semiconductor chip is in a new mode. If it is in a new mode, the simulator module 74 updates the duty cycle for each signal using the toggles on one of the plurality of counters for each signal. It then begins counting the toggles for the signals in the new mode.

Although the simulator module 74 is collecting activity statistics for the entire semiconductor chip design, it should be obvious to one skilled in the art that the analysis can be limited to certain power modules or nodes or the references associated thereunder with the user inputting any remaining activity values. The simulator module 74 then sums the activity values and the delta values 166 and writes them to the scenario database 168.

Power Estimation Module

Figure 6:
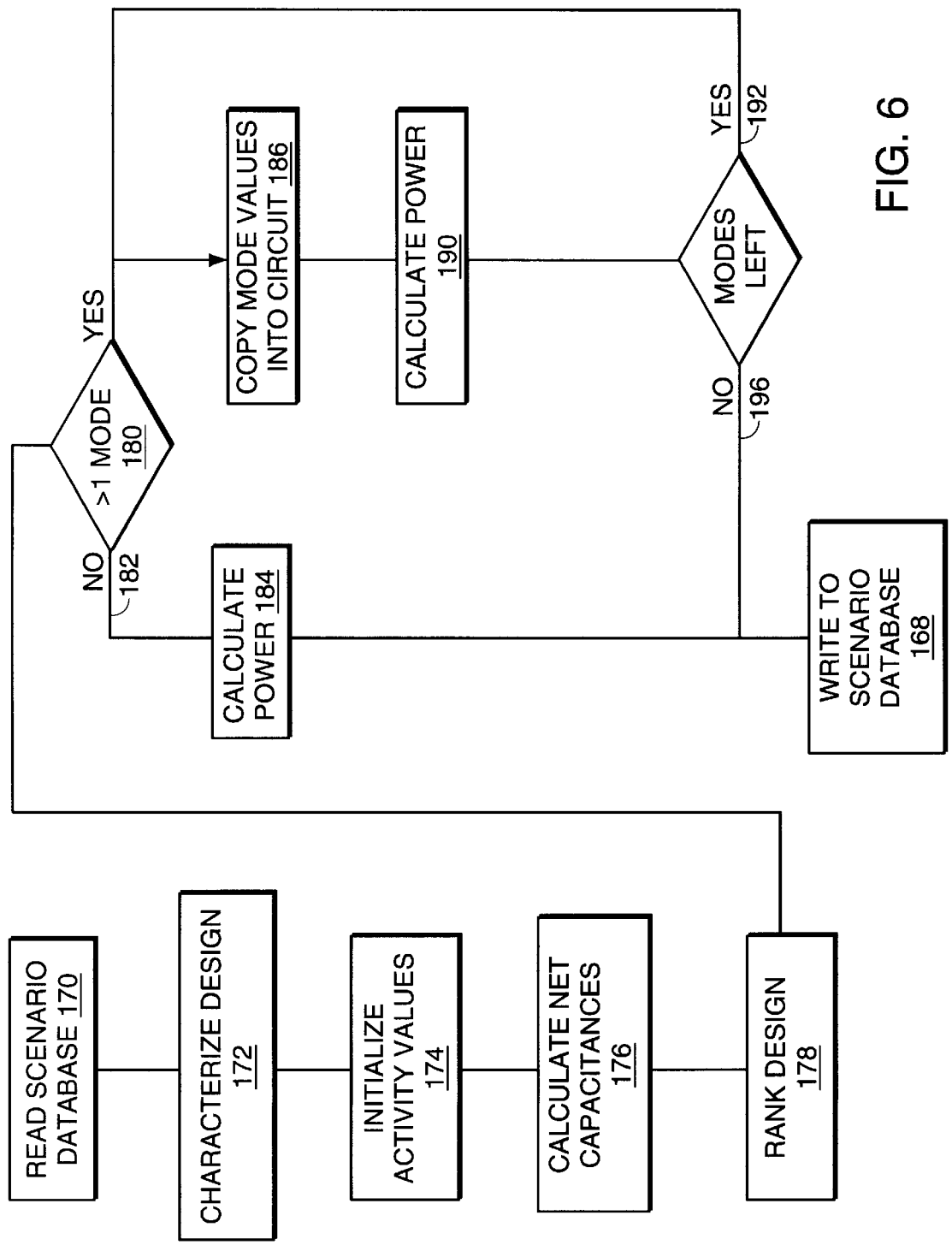
FIG. 6 is a data-flow diagram of a power calculation procedure for the system according to FIG. 2.

The power estimation module 76 is illustrated in FIG. 6. The power estimation module 76 reads the scenario database 170 for the power netlist, generated by the micro-synthesis module 70 and the technology file. At this point, some components in the power netlist may be associated with power modules that are technology primitives, such as memories or I/O pads, while others are associated with technology-independent power modules such as adders or registers. Before the power estimation module 76 can calculate the power consumed by the technology-independent power modules, their circuit characteristics must be defined by examining the technology file 172.

The technology file is a small file and disposed therein are a plurality of circuits of low (complexity, such as a single NAND gate with two inputs, an XOR gate or a flip-flop. The lack of complexity of the logic modules allows the technology file to remain small and, thus, easy to produce. These circuits have parameters, such as size, energy and input capacitance, for example.

The power estimation module 76 examines the power modules in the netlist. For each technology-independent power module, the power estimation module 76 finds appropriate circuits in the technology file. Due to the low complexity of the circuits in the technology file, the power estimation module 76 must extrapolate the circuits disposed therein to approximate the components represented by the power modules. For example, the technology file does not have a NAND gate with more than two inputs, but does have a NAND with two inputs. Accordingly, the power estimation module 76 extrapolates the NAND gate with two inputs to a more complex NAND gate with more than two inputs and determines the resulting circuit parameters. After the extrapolation, the power estimation module 76 binds the more complex circuit parameters generated to the circuit primitives of the power module. The power estimation module 76 repeats this process for each of the technology-independent power modules, thereby defining technology implementations for all power modules in the netlist.

The pow r estimation module 76 uses the power netlist and the chosen technology implementation, whether from the technology file, the user-defined technology library, the default or interactively chosen by the user, to calculate the power. To calculate the dynamic power consumed when driving capacitance loads, the power estimation module 76 must calculate the capacitance of the component nets which is also known as the interconnections between the components 176. This procedure is described hereinafter.

After the power estimation module 76 calculates the capacitance of the nets, the power estimation module 76 has to determine the activity values of the signals of the semiconductor chip design 74. To do so, the simulator module ranks the design 178 as described with reference to FIG. 5. If the semiconductor chip design only has one mode 182, then the simulator module 74 will propagate the activity values and the delta activity values for that mode through the semiconductor chip design. Once the power estimation module 76 receives the activity values, the power estimation module 76 can calculate the power consumed by the semiconductor chip design 184.

If the semiconductor chip design has more than one mode 186, the power estimation module 76 will reinitialize the activity values for the semiconductor chip design to represent the next mode 186. The simulator module 74 will then propagate the activity values and the delta activity values for that mode. The power estimation module 76 and ihe simulator module 74 will repeat this process for each mode of the semiconductor chip design 192. When all the modes of the semiconductor chip design are addressed 196, the power estimation module 76 calculates the total power of the semiconductor chip design 190. It should be obvious to one skilled in the art that the power estimation module 76 can calculate power in a different order or manner without diverging from the scope of the invention.

For each section of the semiconductor chip design, the power estimation module 76 calculates power consumed 184, 190 that is the sum of the dynamic power and the static power. The power consumed is written to the scenario database 168 and displayed on the GUI.

Interconnection Capacitance Estimation The power consumed by nets of the semiconductor chip design is a function of the capacitance, area, length, and activity of each net. The nets include intermodule nets, intraoperator nets, and clock nets. As used herein, an "intermodule net" is a net that connects power modules that were named in the HDL source description 62. As used herein, an "intraoperator net" is a net within a power module, such as the carry-out nets within an adder module. As used herein, a "clock net" is a net that drives one or more clock inputs to registers on the chip.

To characterize the intermodule nets the power estimation module 76 calculates the length of the wire connecting the power modules on the intermodule net by the equation:

$$L = (sqrt((fo *A))/2$$

Where fo=fanout of the node, which is the total number of power modules and logical operators on the net minus 1, and A=the sum of the area of the power modules and operators connected to the node The power for the net is then computed by multiplying this length by the product of a parameter from the technology file related to capacitance per unit length, the clock rate and the net activity.

To characterize intraoperator nets, the power estimation module 76 determines the number of nets in the power module by using a rule that relates the width of the power module to the presence and number of nets therein. In the preferred embodiment, the power estimation module 76 assumes the wires that connect the operators have a constant length. Thereafter, the power estimation module 76 computes the power consumed by the interoperator net by the equation:

$$Power = clock * number\ of\ nets * activity * capacitance * length$$

To characterize clock nets, the power estimation module 76 must assess a number of registers driven by the clock and the length of wire connecting the registers. From the length of the wire the power estimation module 76 can determine capacitance of the clock net, and therefore the power consumed by the net.

To accurately calculate the length of the wire connecting the registers, the power estimation module 76 must also compute a number of buffer cells that will be added to the semiconductor chip design. Buffer cells ensure that a load on the clock signal does not increase beyond predetermined limits and that the timing constraints of the semiconductor chip design are met. Typically, the semiconductor manufacturer adds buffer cells to the semiconductor chip design after the semiconductor chip is placed and routed. Thus, the number and kind of buffers is unknown during the power consumption estimation.

Different vendors provide slightly different techniques for adding buffers and wiring clocks. Accordingly, the power estimation module 76 provides the user with more than one characterization scheme for estimating the power consumed by the clock nets. The power estimation module 76 allows the user to interactively choose between two common techniques for adding buffers and wiring the clock: spine-based techniques and tree-based techniques.

The spine-based technique allows a variable number of spine drivers used to drive the spine. The spine can be driven by an I/O pad, an internal driver cell, or two internal driver cells, for example. The vendor will also specify whether the clock net can have tributary or secondary buffers. Once the user specifies the constraints of the clock net, the power estimation module 76 determines the area covered by the clock net and computes the length of the wires, the spine and the tributaries.

The power estimation module 76 sums the areas of the power modules having the clock net as an input to compute the total area covered by a clock net. The power estimation module 76 uses the area of the clock net to calculate the length of the spine, which is the square root of the area. The power estimation module 76 estimates the height of a module disposed on the clock net, and divides the length of the spine by the height of a module to generate the number of rows of the clock net. The number of tributaries is half the number of rows, because they can be located on either side of the spine. The length of the spines and their tributaries are used to compute the capacitance of the clock net, which in turn is used to calculate the power consumed by the clock net.

On the other hand, if the user chooses the tree-based technique to add buffers and lay the wiring, the user can specify the type of root, the type and number of branches, and the type and number of leaves. The root, branches, and leaves are separate levels, which each cover an area and drive a number of pins. The root level is the highest, and it does not have any buffers. The branch levels, if present, have buffers. The leaf levels are the lowest levels, closest to the flip-flops, and they have buffers. If no branch levels are present, the number of buffers in the leaf level is equal to the number of flip-flops on the clock net divided by the leaf fanout. All the levels have a fanout constraint, where the fanout is the total number of pins the level can drive.

The clock net will be comprised of a combination of root levels, branch levels and leaf levels necessary to comply with their respective fanout limits while covering the clock net area. For example, if a clock net had to cover 1 mm$^2$, had 600 pins, and a fanout of 10, to comply with the fanout, the tree would have one root, six branches, and sixty leaves.

The power estimation module 76 can calculate the area covered by the net once the clock net's number of branches and leaves are specified. In the above example, the root level would cover 1 mm$^2$, each branch would cover 0.1 mm and each leaf would cover 0.01 mm$^2$. Using the area covered, the power estimation module 76 can compute the wire length for each of the levels using techniques well known in the art. The power estimation module 76 uses the sum of the areas and lengths to find the capacitance of the nets, and thereby the power consumed by the clock net. The invention may be embodied in other specific forms without departing from the spirit or essential characteristics thereof. The present embodiments are, therefore, to be considered in all respects as illustrated and not restrictive, the scope of the invention being indicated by the appended claims, rather than by the foregoing description, and all changes which come within the meaning and range of equivalency as the claims are therefore intended to be embraced therein.

The embodiments of the invention in which an exclusive property or privilege is claimed are:

1. An electrical design tool that analyzes at least a portion of an electrical design, the electrical design includes RTL elements that are described at a register transfer level, the electrical design tool comprising:

a plurality of technology dependent power modules;

an analysis module including a micro-synthesis module adapted to generate an interconnected set of technology independent components at a micro-architectural level of abstraction representative of the RTL elements and selectively associate at least one of the plurality of power modules with at least one of the technology independent components, the analysis module adapted to generate a sum of power consumed respectively by the components;

an output device adapted to communicate the sum of the power consumed by at least a portion of the components representative of the at least a portion of the electrical design.

2. The electrical design tool according to claim 1 wherein at least one of the components capable of being represented by more than one technology implementation.

3. The electrical design tool according to claim 1 wherein the interconnected set represents power characteristics of the RTL elements and connections between the RTL elements rather than substantial functionality of the RTL elements and the connections between the RTL elements.

4. The electrical design tool according to claim 1 wherein at least a portion of the components are the RTL elements.

5. The electrical design tool according to claim 1 wherein at least a portion of the components are logic circuits characterized for their power consumption.

6. The electrical design tool according to claim 1 wherein the micro-synthesis module generates a portion of the interconnected set by inferring components from the RTL elements.

7. The electrical design tool according to claim 1 wherein at least portions of the components are pins and the micro-synthesis module selectively associates each of the pins with a pinclass of one of the power modules.

8. The electrical design tool according to claim 1 wherein one of the components has a bus having pins, the micro-synthesis module associating at least one of the pins with a pinclass of one of the plurality of power modules.

9. The electrical design tool according to claim 1 further comprising a default change system adapted to receive an interactive association from a user of at least a portion of one of the components with at least one of the plurality of power modules.

10. The electrical design tool according to claim 1 wherein the components include at least one user-defined module having technology dependent parameters disposed in a technology file, such that at least one of the components in the interconnected set are technology dependent.

11. The electrical design tool according to claim 1 wherein the electrical design has more than one state, the analysis module adapted to generate the sum of the power consumed for each more than one state.

12. The electrical design tool according to claim 1 wherein at least one of the plurality of power modules include a transition parameter that is adapted to model a state of a memory component and provide the state to the analysis module such that the analysis module generates the sum of the power consumed for the state.

13. The electrical design tool according to claim 1 wherein the analysis module is adapted to receive a revised detailed description of a portion of the electrical design and to generate a sum of power consumed by the RTL elements as modified by the revised detailed description.

14. The electrical design tool according to claim 1 wherein the analysis module ties the components and corresponding power modules to a technology implementation and generates the sum of the power consumed using activity data of each corresponding power module.

15. The electrical design tool according to claim 14 wherein the activity data is provided by a user.

16. The electrical design tool according to claim 14 wherein the electrical design has circuit inputs, circuit outputs, and initial activity data and the analysis module further comprises a simulator module adapted to generate the activity data for connections in the interconnected set, the simulator modules includes:
   an ordering module adapted to rank the power modules, the rank approximately designating the order of the components from the inputs to the outputs; and
   a propagation module adapted to propagate the initial activity data from the circuit inputs to the circuit outputs generating activity data throughout the electrical design.

17. The electrical design tool according to claim 16 wherein the ordering module cuts the components and corresponding power modules included in the interconnected set that are disposed in a loop to rank the components and the propagation module operates iteratively to adjust the activity data through the loop until the activity data substantially stabilize for each connection in the loop.

18. The electrical design tool according to claim 16 wherein the simulator module generates activity data of pins, and the components include nets having the activity data of pins.

19. The electrical design tool according to claim 16 wherein the simulator module generates activity data for pins of each cell.

20. The electrical design tool according to claim 16 wherein the simulator module is adapted to initiate deltas when two signals from one connection are asynchronous and aggregate the deltas with the activity data, such that the activity data more closely represents a gate level abstraction of the electrical design.

21. The electrical design tool according to claim 1 wherein the output device is a graphical user interface that represents at least a portion of the components and the sum of the power consumed by the portion of the components as a tree.

22. The electrical design tool according to claim 21 wherein the user interactively selects the portion of the tree to display on the graphical user interface.

23. The electrical design tool according to claim 1 wherein the output device is a graphical user interface that represents at least a portion of the components and the sum of the power consumed by the at least portion of the components as a frequency display.

24. The electrical design tool according to claim 1 wherein the output device colorizes the components in by a standard non-linear thermal spectrum by the sum of the power consumed by each of the components.

25. The electrical design tool according to claim 1 wherein the output device is a report in i file.

26. The electrical design tool according to claim 1 wherein the components include clock nets that the microsynthesis module characterizes and associates with a power module.

27. The electrical design tool according to claim 1 further comprising more than one technology file which the microsynthesis module associates with a portion of the electrical design where the technology file contains simple circuits characterized for power consumption of one fabrication technology.

28. The electrical design analysis tool according to claim 27 wherein the technology file includes a plurality of simple modules, the simple modules include associated circuit parameters, the analysis module adapted to extrapolate the plurality of simple modules and associated circuit parameters to approximate the components and bond the associated power modules and associated primitives to a technology implementation.

29. The electrical design tool according to claim 1 wherein components include nets and cells and the power consumed includes static power and dynamic power consumed by the cells and the nets.

30. An electrical design tool according to claim 1, wherein the analysis module generates a set of interconnected technology independent power modules and technology dependent memory modules.

31. An electrical design tool according to claim 1, wherein the technology independent components are parameterized.

32. An electrical design tool according to claim 1, wherein each technology dependent power module contains technology parameters in one fabrication technology.

33. An electrical design tool according to claim 1, wherein the analysis module calculates the power of the components using closed-form equations and associating the closed-form equations with at least one technology dependent power module.

34. A method for analyzing at least a portion of an electrical circuit design, the method comprising:
   providing a portion of the electrical circuit design described by RTL elements;
   generating an interconnected set of technology independent components at a micro-architectural level of abstraction from the RTL elements;
   associating at least one of a plurality of power modules with each of the technology independent components; and
   generating a sum of power consumed respectively by the components.

35. The method according to claim 34, further comprising:
   providing more than one technology representation in a power module.

36. The method according to claim 34 wherein the act of generating an interconnected set of technology independent components further comprises:
   generating a tree of components and connections between components;

wherein the tree represents power characteristics of the RTL elements and connections between RTL elements rather than substantial functionality of the RTL elements and the connections between the RTL elements.

37. The method according to claim 34, further comprising:
inferring technology independent micro-architectural components from the RTL elements.

38. The method according to 37, wherein the components include pins.

39. The method according to claim 38, further comprising:
selectively associating each of the pins with a pinclass of one of the power modules.

40. The method according to claim 34, wherein the electric design has more than one state further comprising:
calculating the power for each state.

41. The method according to claim 34 further comprising:
providing a memory component that models a state within at least one of the plurality of power modules.

42. A computer program product for use on a computer system for analyzing at least a portion of an electrical circuit design, the computer program product comprising a computer usable medium having computer readable program code thereon, the computer readable program code including:
computer code for providing a portion of the electrical circuit design described by RTL elements;
computer code for generating an interconnected set of technology independent components at a micro-architectural level of abstraction from the RTL elements;
computer code for associating at least one of a plurality of power modules with each of the technology independent components; and
computer code for generating a sum of power consumed respectively by the components.

43. The computer program product according to claim 42, further comprising:
computer code for providing more than one technology representation in a power module.

44. The computer program product according to claim 42, wherein the computer code for generating an interconnected set of technology independent components further comprises:
computer code for generating a tree of components and connections between components; wherein the tree represents power characteristics of the RTL elements and connections between RTL elements rather than substantial functionality of the RTL elements and the connections between the RTL elements.

45. The computer program product according to claim 42, further comprising:
computer code for inferring technology independent components from the RTL elements.

46. The computer program product according to claim 45, wherein the components include pins.

47. The computer program product according to claim 46, further comprising:
associating each of the pins with a pinclass of one of the power modules.

48. The computer program product according to claim 42, wherein the electric design has more than one state further comprising:
computer code for calculating the power for each state.

49. The computer program product according to claim 42 further comprising:
computer code for providing a memory component that models a state within at least one of the plurality of power modules.

50. An electrical design tool that analyzes an electrical circuit design, the electrical circuit design includes RTL elements that are described at a register transfer level, the electrical design tool comprising:
power modules containing technology dependent data;
a power equation module containing technology independent power equations for electrical components at a micro-architectural level of design;
a power calculation module identifying micro-architectural RTL elements and power equations that correspond to the micro-architectural RTL elements, associating the required technology dependent data with the power equations and calculating the power for the electrical circuit design.

51. A method of representing an electric circuit component for power calculation, the method comprising:
maintaining a data storage location for holding a power module;
associating data representative of power for each state of the electric circuit component with the power module;
associating data representative of power for each event of the electric circuit component with the power modules
associating input stimuli with the electric circuit component;
providing the power module and the input stimuli to an analysis module; determining in the analysis module the number of times each event occurs for the electric circuit component based at least in part on the input stimuli;
determining in the analysis module the amount of time associated with each state for the electric circuit component based at least in part on the input stimuli: and
calculating the power in the analysis module for the electric circuit component based at least on the number of times each event occurs, the time associated with each state, the power for each state and the power for each event.

52. The method according to claim 51, wherein the electric circuit component is described at a level of abstraction above a transistor level.

53. A method according to claim 51, wherein the electric circuit component is a memory circuit.

54. A method for determining a change in mode of an electric circuit component for calculating power of the electric circuit component where the electric circuit component has more than one mode of operation, the method comprising:
providing the electric circuit design to an analysis module;
providing input stimuli for the electric circuit design to the analysis module;
providing data indicative of each of the more than one mode to the analysis module;
simulating the electric circuit design based on the input stimuli; and
determining if the electric circuit design has changed modes based in part on the data.

55. The method according to claim 54, further comprising:
calculating the power if the circuit has changed modes.

56. The method according to claim 54, wherein the electric circuit component is described at a level of abstraction above a transistor level.

57. The method according to claim 54, wherein the electric circuit component is a memory module.

58. A computer program product for operation on a computer system in conjunction with a power calculation tool, the computer program product comprising a computer usable medium having computer readable data thereon, the computer readable data including:

computer readable data representative of power for each state of the electric circuit component; and computer readable data representative of power for each event of the electric circuit component;

wherein based on input stimuli for the electric circuit component the power calculation tool can calculate power consumed based on the state data and the event data for the electric circuit component.

59. The computer program product according to claim 58, further comprising:

computer code for associating input stimuli with the electric circuit component;

computer code for providing the power module and the input stimuli to an analysis module;

computer code for determining in the analysis module the number of times each event occurs for the electric circuit component based at least in part on the input stimuli;

computer code for determining in the analysis module the amount of time associated with each state for the electric circuit component based at least in part on the input stimuli; and computer code for calculating the power in the analysis module for the electric circuit component based at least on the number of times each event occurs, the time associated with each state, the power for each state and the power for each event.

60. The computer program product according to claim 58, wherein the electric circuit component is described at a level of abstraction above a transistor level.

61. The computer program product according to claim 58, wherein the electric circuit component is a memory circuit.

62. A computer program product for operation on a computer system in conjunction with a power calculation tool, the computer program product comprising a computer usable medium having computer readable data thereon, the computer readable data including:

computer code for providing an electric circuit design to an analysis module;

computer code for providing input stimuli for the electric circuit design to the analysis module;

computer code for providing data indicative of each of the more than one mode to the analysis module;

computer code for simulating the electric circuit design based on the input stimuli; and computer code for determining if the electric circuit design has changed modes based in part on the data.

63. The computer program product according to claim 62, further comprising:

computer code for calculating the power if the circuit has changed modes.

64. The computer program product according to claim 62, wherein the electric circuit component is described at a level of abstraction above a transistor level.

65. The computer program product according to claim 58, wherein the electric circuit component is a memory module.

* * * * *